(12) United States Patent
Tamura et al.

(10) Patent No.: US 7,479,315 B2
(45) Date of Patent: Jan. 20, 2009

(54) MATERIAL FOR FUEL-SYSTEM PART AND FUEL-SYSTEM PART COMPRISING THE SAME

(75) Inventors: Tsutomu Tamura, Ohtsu (JP); Tomohide Nakagawa, Ohtsu (JP); Shoji Kouketsu, Tsuruga (JP); Gaku Maruyama, Tsuruga (JP); Daisuke Tsutsumi, Nishikasugai-gun (JP); Junji Koizumi, Nishikasugai-gun (JP); Katsushi Ito, Nishikasugai-gun (JP); Haruyasu Mizutani, Nishikasugai-gun (JP)

(73) Assignees: Toyo Boseki Kabushiki Kaisha, Osaka-Shi (JP); Toyoda Gosei Co., Ltd, Nishikasugai-Gun (JP)

( * ) Notice: Subject to any disclaimer, the term of this patent is extended or adjusted under 35 U.S.C. 154(b) by 0 days.

(21) Appl. No.: 10/537,917

(22) PCT Filed: Dec. 8, 2003

(86) PCT No.: PCT/JP03/15642

§ 371 (c)(1),
(2), (4) Date: Nov. 28, 2006

(87) PCT Pub. No.: WO2004/052964

PCT Pub. Date: Jun. 24, 2004

(65) Prior Publication Data

US 2007/0149706 A1    Jun. 28, 2007

(30) Foreign Application Priority Data

Dec. 10, 2002  (JP) .............................. 2002-358515
Jul. 2, 2003    (JP) .............................. 2003-190330

(51) Int. Cl.
*B29D 23/00*  (2006.01)
*C08L 77/00*  (2006.01)
*B32B 27/08*  (2006.01)

(52) U.S. Cl. .................. 428/36.91; 138/137; 138/140; 138/141; 428/36.9; 428/36.92; 525/66; 525/183

(58) Field of Classification Search .................. 525/66, 525/183; 428/36.91, 36.9, 36.92; 138/137, 138/140, 141
See application file for complete search history.

(56) References Cited

U.S. PATENT DOCUMENTS 5,147,944 A * 9/1992 Takeda .................... 525/432
6,887,581 B2 * 5/2005 Tamura et al. ........... 428/474.4

FOREIGN PATENT DOCUMENTS

| EP | 262796 A | 4/1988 |
|----|----------|--------|
| JP | 51-24682 A | 2/1976 |
| JP | 56-64866 A | 6/1981 |
| JP | 58-201845 A | 11/1983 |
| JP | 58-206666 A | 12/1983 |
| JP | 63-057668 A | 3/1988 |
| JP | 04-086257 A | 3/1992 |
| JP | 53-15862 B | 11/1993 |
| JP | 5-345349 A | 12/1993 |
| JP | 06-047848 A | 2/1994 |
| JP | 6-191296 A | 7/1994 |
| JP | 9-29904 A | 2/1997 |
| JP | 2002-326326 A | 11/2002 |
| JP | 2003-001770 A | 1/2003 |
| JP | 2003-012023 A | 1/2003 |
| JP | 2003-238798 A | 8/2003 |
| JP | 2004-002566 A | 1/2004 |
| WO | WO 93-06176 A | 4/1993 |

* cited by examiner

*Primary Examiner*—Ana L Woodward
(74) *Attorney, Agent, or Firm*—Kenyon & Kenyon LLP

(57) ABSTRACT

A material for fuel-system parts which is excellent in impact strength, rigidity, elongation, unsusceptibility to swelling with liquid fuels including gasoline, and gasoline-barrier properties and has satisfactory moldability. The material for fuel-system parts comprises a resin composition comprising 100 parts by weight of a given polyamide resin (A) and 11 to 100 parts by weight of a resin (B) having a lower glass transition temperature than the polyamide resin (A) and having a functional group reactive with the polyamide resin (A), and has a structure in which the polyamide resin (A) serves as a matrix ingredient and the resin (B) serves as a domain ingredient.

8 Claims, 2 Drawing Sheets

MATERIAL FOR FUEL-SYSTEM PART AND FUEL-SYSTEM PART COMPRISING THE SAME

This is a 371 national phase application of PCT/JP2003/015642 filed 08 Dec. 2003, claiming priority to Japanese Application No. 2002-358515 filed 10 Dec. 2002 and No. 2003-190330 filed 02 Jul. 2003, the contents of which are incorporated herein by reference.

TECHNICAL FIELD

This invention relates to a material for a fuel system part, which is superior in impact strength, rigidity, elongation, swelling resistance to liquid fuels such as gasoline and the like, and gas barrier property to liquid fuels such as gasoline and the like (gasoline barrier property), and which has fine moldability, as well as a fuel system part using the same.

BACKGROUND ART

Use of resin for fuel system parts such as a fuel tank and a tube of automobiles, a canister, a fuel pump module and the like has been considered for a long time to advantageously reduce weight and increase designability. For example, a fluorine-treated high density polyethylene material (JP-B-53-15862) and a multilayer laminate material of ethylene vinyl alcohol copolymer resin (EVOH) and high density polyethylene (JP-A-9-29904) have been proposed for a fuel tank. However, the fluorine treated high density polyethylene material is insufficient in the gasoline barrier property. On the other hand, while the multilayer laminate material of EVOH and high density polyethylene is superior in the gasoline barrier property, since it requires multilayer blow molding, a complicated and expensive molding apparatus needs to be used, which increases molding processing costs. In addition, the freedom of shape and design of the molded product is limited.

Under the circumstances, the development of a material for a fuel system part, which permits molding processing with a conventional molding apparatus, and which is superior in the properties of gasoline barrier property, impact resistance and the like has been strongly demanded.

Meanwhile, since poly-meta-xylylene adipamide has superior oxygen barrier property, it is considered for a material of packaging films (JP-A-51-24682) or multilayer blow molded beverage containers (JP-A-56-64866), and further for a material of a fuel tank made of multilayer hollow formed parts equipped with an inner layer and an outer layer, which comprise high density polyethylene as a main component (JP-A-5-345349, JP-A-6-191296). When it comes to molding with a conventional molding apparatus and use of the resulting product as a fuel system part, however, although a resin composition of a polyphenylene sulfide resin and a polyolefin resin has been proposed (JP-A-6-191296), it has not been put to practical use due to its insufficient gasoline barrier property. The molded products of a poly-meta-xylylene adipamide resin alone are superior in various gas barrier properties, but extremely weak in impact resistance. To improve impact resistance, addition of nylon 66 and ethylene copolymer to a poly-meta-xylylene adipamide resin has been considered (JP-A-58-201845, JP-A-58-206666), but such has not been practiced seemingly because simultaneous achievement of alcohol-containing gasoline barrier property and impact resistance is difficult, which is required of a material for a fuel system part.

DISCLOSURE OF THE INVENTION

The present invention aims at providing a material for a fuel system part, which comprises a resin composition, which is superior in mechanical properties such as impact strength, rigidity and elongation, swelling resistance to liquid fuels such as gasoline and the like, gasoline barrier property, particularly alcohol-containing gasoline barrier property, and which can be molded using a conventional molding apparatus.

The present inventors have conducted intensive studies in an attempt to solve the above-mentioned problems and completed the present invention. Accordingly, the present invention relates to a material for a fuel system part, which comprises a resin composition comprising a polyamide resin (A) comprising, as an essential component, meta-xylylenediamine as a diamine component, and resin (B) having a glass transition temperature lower than that of the aforementioned polyamide resin (A) and a functional group capable of reacting with the aforementioned polyamide resin (A), at a ratio of 11-100 parts by weight relative to 100 parts by weight of the aforementioned polyamide resin (A), wherein the aforementioned polyamide resin (A) is a matrix component, and the aforementioned resin (B) is a domain component, preferably the material for a fuel system part, wherein the aforementioned domain has an average particle diameter of not more than 3 μm. In addition, the present invention relates to a polyamide resin material for a fuel system part, which comprises, as an essential component, meta-xylylenediamine as a diamine component and which has an izod impact strength with notch at −40° C. of not less than 200 J/m and a permeability calculated from the weight change, as measured by a cup method, of a solution of toluene (45 vol %), isooctane (45 vol %) and ethanol (10 vol %) after 250 hr at 65° C. of not more than 30 g·mm/m²·day.

In a preferable embodiment of the present invention, the above-mentioned polyamide resin (A) is selected from the group consisting of a poly-meta-xylylene adipamide resin, a poly-meta-xylylene pimelamide resin, a polyamide resin comprising meta-xylylenediamine, terephthalic acid and adipic acid, a copolymer thereof and a blend thereof. As another preferable embodiment, an embodiment wherein the above-mentioned resin (B) is a polyolefin resin having a functional group capable of reacting with polyamide resin (A) can be mentioned, and more preferably, an embodiment wherein resin (B) has an acid anhydride group, can be mentioned.

Moreover, the present invention provides a fuel system part comprising the above-mentioned material for a fuel system part, particularly, a fuel container made from the above-mentioned material for a fuel system part.

DETAILED DESCRIPTION OF THE INVENTION

Figure 1:
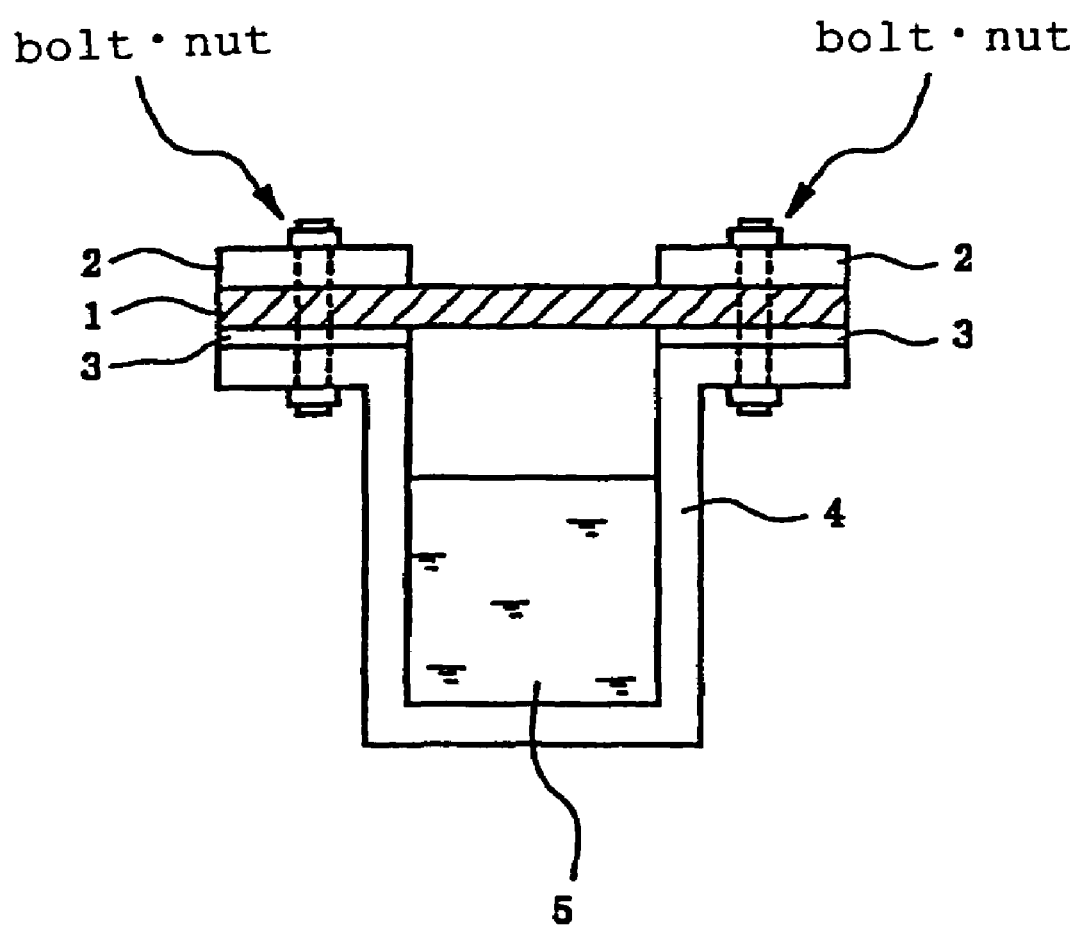
FIG. 1 shows a cup with a sample fixed thereto for the measurement of the weight change by a cup method.

The material for a fuel system part of the present invention is characterized by the below-mentioned resin composition, and from another aspect of the invention, characterized by a given impact strength and the permeability (gasoline barrier property) of an alcohol-containing gasoline solution. As used herein, the "fuel system part" means parts that come into direct or indirect contact with gasoline, alcohol-containing gasoline, light oil and the like used for internal combustion such as engine etc. and the like. As the fuel system part, fuel containers such as a gasoline tank and the like, a tube, a canister, a fuel pump module, a valve, a joint and the like used for transporting fuel and exhaust gas can be mentioned.

A fuel pump module is a tool for pumping up gasoline in a tank. The fuel pump module comprises a fuel pump conjugated with two or more fuel system parts such as canister, valve and the like.

Here, the "parts that come into indirect contact" with gasoline and alcohol-containing gasoline refers to the parts not in direct contact with a liquid such as gasoline, alcohol-containing gasoline and the like but having a part in contact with the vapor thereof or the parts possibly in contact with a liquid or vapor thereof during oil filling and the like.

As the fuel system part formed from the material of the present invention, for example, a fuel tank, a tube for transporting a fuel, a connector to connect them and the like can be mentioned. The embodiment using the material of the present invention is not particularly limited, and may be any as long as it contains the material of the present invention in the fuel system part. As a preferable embodiment, fuel system parts such as a fuel container (tank etc.) and the like made from the material of the present invention can be mentioned. Particularly, an injection molded product using the material of the present invention has high impact resistance and superior alcohol-containing gasoline barrier property. Thus, it can advantageously and economically provide an injection molded fuel tank having a high freedom of shape as a fuel tank of an automobile. In another embodiment, a fuel system part has a multilayer structure, wherein at least one layer thereof is made from the material of the present invention. In this case, a layer not in direct contact with a liquid or vapor of a fuel but possibly in contact therewith, when the fuel has permeated from the layer in direct contact therewith, may be made from the material of the present invention.

The present invention is explained concretely in the following.

The resin composition to be used in the present invention contains the following polyamide resin (A) and resin (B), and has a structure comprising the below-mentioned matrix and domain. While the following explanation mainly describes resin (B) as a polyolefin resin, resin (B) is not limited to a polyolefin resin in the present invention, and any resin can be used as long as it has a glass transition temperature lower than that of polyamide resin (A) and has a functional group capable of reacting with the aforementioned polyamide resin (A).

<Polyamide Resin (A) (Matrix)>

Polyamide resin (A) to be used in the present invention comprises meta-xylylenediamine as a main component of the diamine component. The polyamide resin (A) may contain, as a diamine component other than meta-xylylenediamine, hexamethylenediamine, nonamethylenediamine, undecamethylenediamine, dodecamethylenediamine and the like. Here, meta-xylylenediamine is contained in a proportion of not less than 70 mol %, preferably not less than 75 mol %, more preferably not less than 80 mol %, still more preferably not less than 95 mol %, most preferably 100 mol %, of the total diamine component of polyamide resin (A).

As the dicarboxylic acid component of polyamide resin (A), terephthalic acid, isophthalic acid, adipic acid, pimelic acid, sebacic acid, suberic acid, azelaic acid, dodecanedioic acid, naphthalenedicarboxylic acid, cyclohexanedicarboxylic acid and the like can be mentioned. The polyamide resin (A) may be further copolymerized with an aminocarboxylic acid component. Specific examples of copolymerizable aminocarboxylic acid include ε-caprolactam, 6-aminocaproic acid, ω-enantolactam, 7-aminoheptanoic acid, 11-aminoundecanoic acid, 9-aminononanoic acid, α-pyrrolidone, α-piperidone and the like.

Of those mentioned above, particularly preferable polyamide resins (A) for the superiority in alcohol-containing gasoline barrier property are poly-meta-xylylene adipamide resin, poly-meta-xylylene pimelamide resin, polyamide resin comprising meta-xylylenediamine, terephthalic acid and adipic acid, copolymers thereof and blends thereof. The polyamide resin (A) to be used in the present invention may be blended with a polyamide resin such as nylon 6, nylon 66, nylon 46, nylon 6T and the like, as long as the alcohol-containing gasoline barrier property is not impaired.

As more preferable polyamide resin (A), a polyamide resin comprising meta-xylylenediamine as the total diamine component, and cyclohexanedicarboxylic acid as a dicarboxylic acid component can be mentioned. In this case, to improve gasoline barrier property, the content of cyclohexanedicarboxylic acid is preferably not less than 3 mol %, more preferably not less than 5 mol %, still more preferably not less than 7 mol % of the dicarboxylic acid component. To improve mold processability by decreasing the melting point, the content of cyclohexanedicarboxylic acid is preferably not more than 70 mol %, more preferably not more than 50 mol %, still more preferably not more than 20 mol %, of the dicarboxylic acid component. The dicarboxylic acid component other than cyclohexanedicarboxylic acid of polyamide resin (A) is not particularly limited, and those mentioned above can be used. As preferable dicarboxylic acid, adipic acid can be mentioned in that alcohol-containing gasoline barrier property, impact resistance and strength can be enhanced. More preferably, the dicarboxylic acid component of polyamide resin (A) comprises cyclohexanedicarboxylic acid and adipic acid.

To improve alcohol-containing gasoline barrier property and impact resistance, relative viscosity (96% sulfuric acid method) of polyamide resin (A) is preferably not less than 1.9, more preferably not less than 2.1, and to improve mold processability, the aforementioned relative viscosity is preferably not more than 3.0, more preferably not more than 2.6.

To improve impact strength, the amount of the amino terminal group and the amount of carboxyl terminal group of polyamide resin (A) are each preferably not less than 25 eq/ton, because the below-mentioned resin (B) and polyamide resin (A) can be sufficiently reacted. From the aspect of impact resistance, the upper limit of the amount of the amino terminal group and the amount of the carboxyl terminal group of polyamide resin (A) is preferably 120 eq/ton.

The amount of the amino terminal group and the amount of the carboxyl terminal group of polyamide resin (A) can be determined as shown below.

Amount of Amino Terminal Group (AEG);

A polyamide sample (0.6 g) is dissolved in phenol/ethanol (50 ml, volume ratio 4/1), then water/ethanol (20 ml, volume ratio 3/2) is added and, as an indicator, one drop of methyl orange is added. An aqueous solution of ethanolic hydrochloric acid (distilled water was added to 0.1 N hydrochloric acid (100 ml) and ethanol (50 ml) to the total amount of 500 ml) is titrated to the obtained solution. Separately, an aqueous solution of ethanolic hydrochloric acid is titrated to a solvent (blank solvent) free of a polyamide sample. The amount of the amino terminal group (AEG) is calculated from the following formula:

$$AEG\ (eq/ton) = \{[(A-B) \times N \times f]/(w \times 1000)\} \times 10^6$$

wherein A is a titer (ml) of an aqueous solution of ethanolic hydrochloric acid to a sample solution, B is a titer (ml) to a blank solvent, N is a concentration (mol/l) of the aqueous solution of ethanolic hydrochloric acid, f is a factor of an aqueous solution of ethanolic hydrochloric acid and w is a sample weight (g).

Amount of Carboxyl Terminal Group (CEG);

Benzyl alcohol (10 ml) is added to a polyamide sample (0.2 g) and the mixture is heated at 180° C. for 5 min to dissolve the sample. This solution is cooled with water for 15 seconds and one drop of phenolphthalein is added as an indicator. An aqueous solution of ethanolic potassium hydroxide (ethanol was added to 0.5 N aqueous potassium hydroxide solution (80 ml) to the total amount (1000 ml)) is titrated to the obtained solution. Separately, an aqueous solution of ethanolic hydroxide is titrated to a solvent (blank solvent) free of a polyamide sample. The amount of the carboxyl terminal group (CEG) is calculated from the following formula:

$$CEG\ (eq/ton) = \{[(A-B) \times N \times f]/(w \times 1000)\} \times 10^6$$

wherein A is a titer (ml) of an aqueous solution of ethanolic potassium hydroxide, B is a titer (ml) to a blank solvent, N is a concentration (mol/l) of the aqueous solution of ethanolic potassium hydroxide, f is a factor of an aqueous solution of ethanolic potassium hydroxide and w is a sample weight (g).

<Resin (B) (Domain)>

The resin (B) to be used in the present invention is a resin having a glass transition temperature lower than that of the above-mentioned polyamide resin (A) and a functional group capable of reacting with the aforementioned polyamide resin (A). Any such resin can be used without particular limitation. Since the glass transition temperature of polyamide resin (A) is generally 50-130° C., the following resins are preferable as resin (B). The numbers in the parentheses are glass transition temperatures the resins generally show.

polyethylene resin (−50° C. to −40° C.),
  polypropylene resin (−20° C. to −15° C.),
  ethylene/α-olefin copolymer resin (ethylene/propylene copolymer, ethylene/octene copolymer, ethylene/butene copolymer, ethylene/butene/styrene copolymer and the like) (−65° C. to −20° C.),
  ethylene ionomer (−50° C. to −10° C.),
  ethylene/acrylic copolymer (−50° C. to −10° C.),
  ethylene/vinyl acetate copolymer (−50° C. to −10° C.),
  polyisoprene resin (−20° C. to −10° C.),
  polychloroprene resin (−50° C. to −20° C.),
  acrylonitrile/butadiene polymer (−30° C. to −10° C.),
  hydrogenated butadiene polymer (−50° C. to −40° C.),
  styrene/butadiene copolymer (−50° C. to −20° C.),
  styrene/butadiene/butylene/styrene copolymer (−50° C. to −20° C.),
  styrene/ethylene/butylene/styrene copolymer (−50° C. to −20° C.),
  polyurethane elastomer (−50° C. to 10° C.),
  polyester elastomer (−50° C. to 10° C.),
  polyamide elastomer (−50° C. to 10° C.) and the like.

As a preferable resin (B) in the present invention, a polyolefin resin can be mentioned. Here, as the polyolefin resin, polyethylene, polypropylene, ethylene/α-olefin copolymer (ethylene/propylene copolymer, ethylene/octene copolymer, ethylene/butene copolymer, ethylene/butene/styrene copolymer and the like), ethylene ionomer, ethylene/ethylacrylate copolymer and the like can be mentioned. Of these, one made to have a melting point of resin (B) of not less than 70° C. by imparting block property to each unit of ethylene and butene is more preferable.

The resin (B) has a functional group (mentioned below) capable of reacting with the above-mentioned polyamide resin (A). The functional group capable of reacting with polyamide resin is a functional group capable of reacting with at least one of an amido group, an amino terminal group and a carboxy terminal group of polyamide resin, which is exemplified by carboxyl group, acid anhydride group (—COOCO—), epoxy group, amino group, oxazoline group, isocyanate group and the like. Of these, acid anhydride group is preferable because it has high reactivity with polyamide resin. As particularly preferable resin (B), therefore, a polyolefin resin having an acid anhydride group can be mentioned. As the acid anhydride group, maleic anhydride group, phthalic anhydride group, itaconic anhydride group and the like can be mentioned. A maleic anhydride group is particularly preferable.

The content of these functional groups is preferably 0.05-8 wt %, more preferably 0.1-5 wt %, relative to the total resin (B). Here, the "content of the functional group" means the amount of a compound having the above-mentioned functional group, relative to the total resin (B). The "amount of a compound to be added" is the amount of a compound (maleic anhydride, phthalic anhydride etc.) to be added to impart functional group capable of reacting with polyamide resin (A) to an unmodified resin having a glass transition temperature lower than that of polyamide resin (A). When the content is less than 0.05 wt %, the compatibility of polyamide resin (A) and resin (B) becomes poor, and the object characteristics (impact resistance, gasoline barrier property) of the resin composition may be difficult to achieve. When it is greater than 8 wt %, polyamide resin (A) and resin (B) form a crosslinking structure, are gelated and exert an adverse influence on the moldability. As long as the content of the above-mentioned functional group is within the aforementioned range relative to resin (B) in the resin composition to be used in the present invention, resin (B) having the functional group and resin (B) without the functional group may be co-used (copolymerized, blended). In this case, the "content of resin (B)" in the resin composition to be used in the present invention is the total amount of resin (B) with a functional group and resin (B) without a functional group as mentioned above.

In the resin composition to be used in the present invention, the content of resin (B) relative to 100 parts by weight of polyamide resin (A) is 11-100 parts by weight, preferably 25-75 parts by weight, more preferably 33-65 parts by weight. When the amount of polyamide resin (A) is too much, the gasoline barrier property becomes superior but impact resistance is degraded. Conversely, when the amount of polyamide resin (A) is too small, the gasoline barrier property is markedly degraded. When the amount of polyamide resin (A) is too small, resin (B) becomes a matrix component and a desired structure cannot be formed.

<Matrix, Domain Structure>

The fuel system part material of the present invention has a structure comprising a matrix and a domain, wherein the matrix component is polyamide resin (A) and the domain component is resin (B). More particularly, the above-mentioned structure comprises domain components finely dispersed in a matrix component, which can be compared to sea (polyamide resin (A)) and islands (resin (B)) present in the sea. The size of each domain (average particle diameter) is preferably not more than 3 μm, more preferably not more than 2 μm. The size of the domain (average particle diameter) is preferably small. Due to the limitation for dividing finely, the lower limit is, for example, not less than 0.05 μm. When the average particle diameter of the domain is within this range, a resin composition superior in both the impact resistance and gasoline barrier property can be obtained. Here, for the measurement of the average particle diameter, a frozen piece of a section perpendicular to the direction of the resin flow of the sample is prepared, colored in $RuO_4$ vapor for 30 min, further subjected to carbon vapor deposition, observed with a JEM2010 transmission electron microscope manufactured by JEOL. Ltd at accelerating voltage 200 kV, direct magnification×5000 and photographed. The obtained picture is applied to an image analyzer to determine an area average particle diameter. When the observed images of the domains are elliptical, this analyzer takes a diameter converted to that of a circle as a particle diameter. In the present invention, the area average particle diameter thus obtained is taken as the average particle diameter of the domain.

As a method of achieving a structure having the aforementioned matrix and domain, a method comprising bringing melt viscosities of the polyamide resin (A) and resin (B) to be used closer to each other's value, a method comprising appropriately controlling the kind and amount of the functional groups that resin (B) has (specifically shown in the below-mentioned Examples etc.), a method comprising reactive processing during melt kneading of polyamide resin (A) and resin (B) under suitable kneading conditions and the like can be mentioned.

In the resin composition of the present invention, polyamide resin (A) and resin (B) are chemically bonded via a functional group and the obtained structure is extremely stable. Thus, even if a conventional molding apparatus is used for molding, a fuel system part having impact resistance and alcohol-containing gasoline barrier property can be stably obtained.

The resin composition to be used in the present invention may further contain weather resistant improvers (e.g., carbon black, copper oxide, alkali metal halide), thermostabilizers (e.g., hindered phenol, thioether, phosphite), photostabilizers (e.g., benzophenone, triazole, hindered amine), releasing agents (e.g., higher fatty acid salt, higher fatty acid, higher fatty acid ester), flowability improvers (e.g., lower aliphatic carboxylic acid, aromatic carboxylic acid), antistatic agent, crystal nucleating agent, lubricant, pigment, dye and the like, which are conventionally used for polyamide resin compositions. The method of adding these is not particularly limited. Of the aforementioned, when a higher fatty acid salt is to be added, polyamide resin (A) and resin (B) are melt kneaded, pelletized and then the salt is preferably added onto the surface thereof, in order to achieve a high izod impact strength. A high izod impact strength can be obtained because, when resin (B) has a functional group capable of reacting with polyamide resin (A), the aforementioned functional group reacts with the higher fatty acid salt to deactivate the functional group on the surface of the pellet, thus inhibiting the reaction between the functional group of resin (B) and polyamide resin (A).

The production method of the resin composition to be used in the present invention is not particularly limited and the composition can be produced using a conventional production apparatus. For example, a method comprising melt-kneading a mixture of the aforementioned polyamide resin (A) and resin (B), and, where necessary, other additives and the like can be mentioned. As the melt-kneading apparatus, a single-screw extruder, a twin-screw extruder, a compression kneader and the like can be mentioned. Since a structure comprising the above-mentioned matrix and domain can be easily obtained, a twin-screw extruder is preferable. Of the twin-screw extruders, one having a large (preferably not less than 20) L/D (L; length of compression member, D; screw diameter) and a screw dimension structure to improve kneading, such as one having many kneading disks, is preferable for fine dispersion of resin (B).

From another aspect, the present invention relates to a polyamide resin material for a fuel system part, which comprises, as an essential component, meta-xylylenediamine as a diamine component, and which has an izod impact strength with notch of not less than 200 J/m at −40° C. as measured according to ASTM D-638, and permeability of an alcohol-containing gasoline solution at 65° C. after 250 hr of not more than 30 g·mm/m²·day (preferably not more than 15 g·mm/m²·day, more preferably not more than 10 g·mm/m²·day) as calculated from the weight change by a cup method according to JIS-Z0208. The alcohol-containing gasoline solution as used herein is a solution prepared in a 23° C. atmosphere and containing toluene 45 vol %, isooctane 45 vol % and ethanol 10 vol %.

Figure 2:
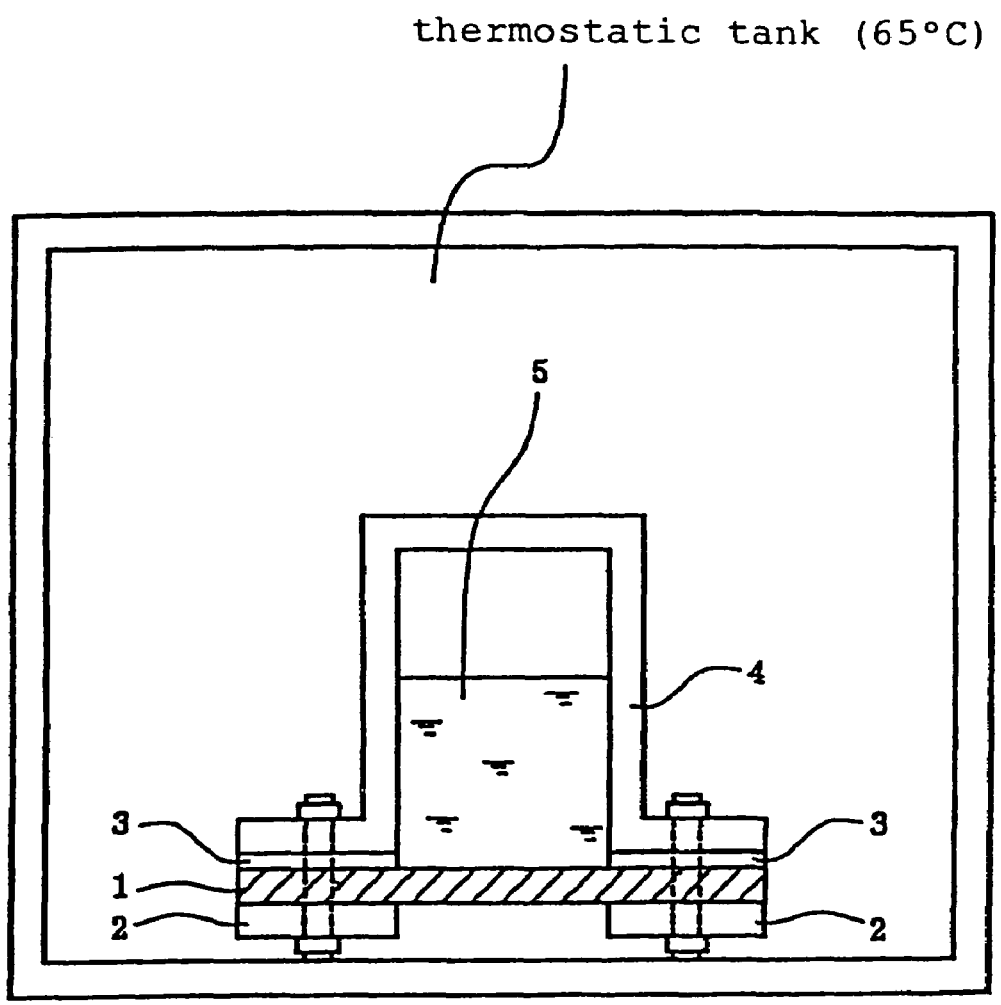
FIG. 2 schematically shows measurement of the weight change by a cup method, so as to determine permeability of an alcohol-containing gasoline solution.

The weight change by the cup method means weight variation relative to the initial weight measured after, as shown in FIG. 1, fixing a measurement subject sample 1 on an aluminum cup 4 (size; inner diameter 40 mm) containing the above-mentioned alcohol-containing gasoline solution 5 (sealed amount 15 g) with a sample holding jig 2 (e.g., porous plate such as sintered metal and the like) and a metal seal 3, and allowing the sample to stand in the state shown in FIG. 2 at 65° C. for 250 hr. The above-mentioned permeability is calculated from the weight change, sample thickness, contact area of the liquid and the time of standing still.

The material for a fuel system part of the present invention preferably shows the above-mentioned permeability of not more than 15 g·mm/m²·day, and contains, as an essential component, cyclohexanedicarboxylic acid as a dicarboxylic acid component. By the use of such a fuel system part material for a fuel system part of an automobile using alcohol-containing gasoline as a fuel, the amount of fuel leakage into the air can be reduced to an extremely small level.

For example, a material for a fuel system part is requested to have high impact resistance, because fuel itself is a combustible, explosive and dangerous substance and a crack in a fuel container on impact can cause an extreme danger. Particularly, impact resistance at a low temperature is requested because the impact resistance of resin becomes low during the cold time. Resin fuel containers are associated with a problem in that the fuel permeates the material and dissipates into the air, which causes both economical and air pollution problems. Therefore, the permeability of the fuel needs to be reduced, which in turn means that the aforementioned impact strength and permeability should be simultaneously satisfied.

The material for a fuel system part of the present invention is a polyamide resin material containing meta-xylylenediamine as an essential component. The "polyamide resin material" is a material containing polyamide resin (A). The material for a fuel system part of the present invention is used to improve the alcohol-containing gasoline barrier property. The aforementioned polyamide resin (A) has particularly superior alcohol-containing gasoline barrier property. However, the aforementioned polyamide resin (A) shows weak impact strength at low temperature. As one embodiment to improve impact strength at low temperature, for example, a material for a fuel system part, which contains the aforementioned polyamide resin (A) and a polyolefin resin having a functional group capable of reacting with the aforementioned polyamide resin (A), wherein the aforementioned polyamide resin (A) is a matrix component and the aforementioned polyolefin resin is a fine domain component, such as a domain component having an average particle diameter of not more than 3 μm, can be mentioned.

In addition, the resin of the above-mentioned domain component may be a resin other than polyolefin resin, as long as it contains a functional group capable of reacting with polyamide resin (A) (provided that the resin has a lower glass transition temperature than does polyamide resin (A)). A domain component which is a resin having a glass transition temperature lower than that of polyamide resin (A) and a functional group capable of reacting with polyamide resin (A) shows the aforementioned izod impact strength with notch and permeability for the following reasons. To be specific, as the above-mentioned polyolefin resin, a structure wherein the aforementioned polyamide resin (A) is a matrix component and a flexible resin other than the aforementioned polyolefin resin and having a low glass transition temperature is a fine domain component, such as a domain component having an average particle diameter of not more than 3 μm, can simultaneously achieve both the impact resistance and gasoline barrier property.

As mentioned above, the material for a fuel system part of the present invention is suggested to be superior in impact resistance at low temperature and extremely superior in alcohol-containing gasoline barrier property at high temperature. Thus, this material is extremely useful as a material for a fuel system part such as a fuel container and the like. Moreover, as mentioned above, since the structure of the resin composition of the present invention comprising a matrix and a domain is extremely stable, even if a fuel system part is produced using this material by a conventional molding apparatus, the above-mentioned structure does not easily change, superior strength property and gasoline barrier property are expected to be maintained, and the mold processing cost becomes beneficially low.

EXAMPLES

The present invention is explained in more detail by referring to Examples, which are not to be construed as limitative.

(A) Polyamide Resin

As the polyamide resin, the following (1)-(6) were prepared. (6) was used as Comparative Example free of a meta-xylylenediamine component.

(1) poly-meta-xylylene adipamide obtained by polycondensation of meta-xylylenediamine and adipic acid (hereinafter to be also referred to as MXD-6);

Relative viscosity (96% sulfuric acid method) was 2.1, the amount of amino terminal group was 80 eq/ton and glass transition temperature was 88° C.

(2) copolymer obtained by polycondensation of 3 kinds of compounds of meta-xylylenediamine (100 mol), adipic acid (85 mol) and terephthalic acid (15 mol) (hereinafter to be also referred to as MXD-6T);

Relative viscosity was 2.1, amount of amino terminal group was 82 eq/ton, melting point was 225° C. and glass transition temperature was 107° C.

(3) poly-meta-xylylene pimelamide obtained by polycondensation of equimolar of meta-xylylenediamine and pimelic acid (hereinafter to be also referred to as MXD-7);

Relative viscosity was 2.2, amino terminal amount was 71 eq/ton and glass transition temperature was 50° C.

(4A) copolymer obtained by polycondensation of 3 kinds of compounds of meta-xylylenediamine (100 mol), adipic acid (90 mol), and 1,4-cyclohexanedicarboxylic acid (10 mol) (hereinafter to be also referred to as MXD-6CHDA-10A);

Relative viscosity was 2.1, amount of amino terminal group was 78 eq/ton, melting point was 245° C. and glass transition temperature was 97° C.

(4B) copolymer obtained by polycondensation of 3 kinds of compounds of meta-xylylenediamine (100 mol), adipic acid (90 mol) and 1,4-cyclohexanedicarboxylic acid (10 mol) (hereinafter to be also referred to as MXD-6CHDA-10B);

Relative viscosity was 2.5, amount of amino terminal group was 54 eq/ton, melting point was 245° C. and glass transition temperature was 97° C.

(5A) copolymer obtained by polycondensation of 3 kinds of compounds of meta-xylylenediamine (100 mol), adipic acid (80 mol) and 1,4-cyclohexanedicarboxylic acid (20 mol) (hereinafter to be also referred to as MXD-6CHDA-20A);

Relative viscosity was 2.1, amount of amino terminal group was 80 eq/ton, melting point was 258° C. and glass transition temperature was 108° C.

(5B) copolymer obtained by polycondensation of 3 kinds of compounds of meta-xylylenediamine (100 mol), adipic acid (80 mol) and 1,4-cyclohexanedicarboxylic acid (20 mol) (hereinafter to be also referred to as MXD-6CHDA-20B);

Relative viscosity was 2.5, amount of amino terminal group was 52 eq/ton, melting point was 258° C. and glass transition temperature was 108° C.

(6) nylon 66 resin (nylon T-662 manufactured by Toyo Boseki Kabushiki Kaisha);

Relative viscosity was 2.2, amino terminal amount was 82 eq/ton and glass transition temperature was 97° C.

The glass transition temperature was adjusted by controlling the temperature and time of polymerization of polyamide resin. In addition, terminal group amount was adjusted by adding a small amount of cyclohexylamine, which is a monofunctional amine, or acetic acid, which is a monofunctional carboxylic acid, to the polymerization starting material.

(B) resin having lower glass transition temperature than polyamide resin (A)

As resin (B), the following (i)-(iv) were used. (iv) was used as Comparative Example free of a functional group capable of reacting with polyamide resin.

(i) Maleic anhydride (0.8 part by weight, reagent special GR, manufactured by Nacalai Tesque) and organic peroxide (0.1 part by weight, percumyl DF manufactured by NOF Corporation) were added to linear medium density polyethylene resin (L-MDPE, 100 parts by weight, Neozex (trademark) 2015M manufactured by Mitsui Chemical) and the mixture was kneaded in a twin-screw extruder at a cylinder temperature of 210° C. The obtained modified L-MDPE was used. This resin had a glass transition temperature of −45° C. and a melting point (DSC method) of 122° C.

(ii) Ethylene/butene copolymer (MI was 1.8, specific gravity was 0.87) modified with maleic anhydride (0.4 wt %) was used. This resin had a glass transition temperature of −59° C. and a melting point (DSC method) of 55° C.

(iii) Ethylene/butene/styrene copolymer (MI was 2.4, specific gravity was 0.85) modified with maleic anhydride (1.4 wt %) was used. This copolymer showed an ethylene/butene/styrene molar ratio of 70/28/2. This resin had a glass transition temperature of −63° C. and a melting point (DSC method) of 95° C.

(iv) Unmodified ethylene/butene copolymer (MI was 0.5, specific gravity was 0.86) was used. This resin was free of a functional group capable of reacting with a polyamide resin. This resin had a glass transition temperature of −60° C. and a melting point (DSC method) of 54° C.

The glass transition temperature (Tg) and melting point (Tm) of each resin were determined according to JIS K 7121 based on the DSC measurement under the following conditions.

(DSC Measurement Conditions)
apparatus: DSC3100 manufactured by Mac Science
pan: aluminum pan (non-airtight type)
sample weight: 10 mg
temperature rise start temperature: −150° C.
temperature rise rate: 10° C./min
atmosphere: argon These resins were measured in the amounts shown in Tables 1-4 and melt kneaded in a twin-screw extruder at a cylinder temperature 270° C., screw rotation speed 150 rpm. The composition (material) obtained using kneading was formed into various samples using an injection molding machine at a cylinder temperature of 280° C. and a metal mold temperature of 40° C., and subjected to the following evaluation.

(Determination of Tensile Property)

The tensile property was determined according to ASTM D-638, wherein the measurement atmosphere temperature was 23° C. (measurement of izod impact strength with notch)

The izod impact strength with notch was measured according to ASTM D-638 using a 4 mm thick sample. The measurement atmosphere temperature was −40° C.

(Determination of Permeability of Alcohol-containing Gasoline Solution)

The permeability of the alcohol-containing gasoline solution was calculated from weight changes by a cup method according to JIS-Z0208. The specific procedures and alcohol-containing gasoline solution to be used for determining the permeability are as mentioned above. The formed part (measurement object) was a molded disc obtained by cutting one surface of an injection molded product (100 mm×100 mm×thickness 1 mm) in a thickness of 0.5 mm. A lower permeability means superiority in alcohol-containing gasoline barrier property.

(Observation of Morphology Structure)

Each resin composition was observed using a JEM2010 transmission electron microscope manufactured by JEOL. Ltd. The observation sample was prepared by cutting out a sample from the center of a sample having the same shape as the sample used for the above-mentioned tensile property, producing a frozen section of a surface perpendicular to the resin flow direction, coloring the section in $RuO_4$ vapor for 30 min and further subjecting the section to carbon vapor deposition. TEM observation was performed using a JEM2010 transmission electron microscope manufactured by JEOL. Ltd. at an accelerating voltage of 200 kV and direct magnification ×5000 and photographed. Then, the obtained photograph was applied to an image analyzer to determine an area average particle diameter of about 100 domains. When the observed images of the domains are elliptical, this analyzer takes a diameter converted to that of a circle as a particle diameter.

The compositions and evaluation results of respective samples are shown in Tables 1-6.

In the Tables, the numerical values in the column of composition are in parts by weight.

In the Tables, the "NB" under the item of "izod impact strength with notch" refers to "non-break", which means being not broken, and the presence of high impact strength.

In the Tables, the "A" under the item of "morphology structure" means a structure wherein the matrix component is a polyamide resin and the domain component is a polyolefin resin, "B" means a structure wherein the matrix component is a polyolefin resin and the domain component is a polyamide resin, and "homogeneous" means that the both resins are homogenized and the matrix and domain cannot be identified.

TABLE 2

| | | | Ex. 6 | Ex. 9 | Ex. 10 |
|---|---|---|---|---|---|
| Composition | poly-amide resin (A) (parts by weight) | (1)MXD-6 | | | |
| | | (2)MXD-6T | 100 | | |
| | | (3)MXD-7 | | | |
| | | (4A)MXD-6CHDA- | | 100 | |
| | | (4B)MXD-6CHDA- | | | 100 |
| | | (5A)MXD-6CHDA- | | | |
| | | (5B)MXD-6CHDA- | | | |
| | | (6)nylon 66 | | | |
| | resin (B) (parts by weight) | (i) modified L-DPE | | | |
| | | (ii) modified copolymer | 43 | 43 | 43 |
| | | (iii) modified copolymer | | | |
| | | (iv) unmodified copolymer | | | |
| Properties | | tensile strength (MPa) | 43 | 43 | 42 |
| | | tensile elongation (%) | >160 | >160 | >160 |
| | | tensile elastic modulus (GPa) | 1.9 | 1.8 | 1.7 |
| | | izod impact strength (J/m) at −40° C. | 290 | 420-NB | 450-NB |
| | | alcohol-containing gasoline barrier property (g · mm/m² · day) | 0.35 | 0.45 | 0.25 |
| | | morphology structure | A | A | A |
| | | average particle diameter (μm) of domain | 0.8 | 0.8 | 0.7 |

TABLE 1

| | | | Ex. 1 | Ex. 4 | Ex. 5 |
|---|---|---|---|---|---|
| Composition | polyamide resin (A) (parts by weight) | (1)MXD-6 | | | |
| | | (2)MXD-6T | 100 | 100 | 100 |
| | | (3)MXD-7 | | | |
| | | (4A)MXD-6CHDA-10A | | | |
| | | (4B)MXD-6CHDA-10B | | | |
| | | (5A)MXD-6CHDA-20A | | | |
| | | (5B)MXD-6CHDA-20B | | | |
| | | (6)nylon 66 | | | |

TABLE 1-continued

|  |  |  | Ex. 1 | Ex. 4 | Ex. 5 |
|---|---|---|---|---|---|
| Properties | resin (B) (parts by weight) | (i)modified L-MDPE |  |  | 7.7 |
|  |  | (ii)modified copolymer | 54 | 38 | 38 |
|  |  | (iii)modified copolymer |  |  |  |
|  |  | (iv)unmodified copolymer |  | 15 | 7.7 |
|  | tensile strength (MPa) |  | 35 | 37 | 40 |
|  | tensile elongation (%) |  | >160 | >160 | >160 |
|  | tensile elastic modulus (GPa) |  | 1.6 | 1.6 | 1.8 |
|  | izod impact strength (J/m) at −40° C. |  | 680-NB | 625 | 450 |
|  | alcohol-containing gasoline barrier property (g · mm/m$^2$ · day) |  | 4.0 | 6.8 | 3.5 |
|  | morphology structure |  | A | A | A |
|  | average particle diameter (μm) of domain |  | 0.8 | 0.8 | 0.7 |

TABLE 3

|  |  |  | Ex. 11 | Ex. 12 | Ex. 13 |
|---|---|---|---|---|---|
| Composition | polyamide resin (A) (parts by weight) | (1)MXD-6 |  |  |  |
|  |  | (2)MXD-6T |  |  |  |
|  |  | (3)MXD-7 |  |  |  |
|  |  | (4A)MXD-6CHDA-10A |  |  |  |
|  |  | (4B)MXD-6CHDA-10B | 100 |  |  |
|  |  | (5A)MXD-6CHDA-20A |  | 100 |  |
|  |  | (5B)MXD-6CHDA-20B |  |  | 100 |
|  |  | (6)nylon 66 |  |  |  |
|  | resin (B) (parts by weight) | (i)modified L-MDPE |  |  |  |
|  |  | (ii)modified copolymer |  | 43 | 43 |
|  |  | (iii)modified copolymer | 43 |  |  |
|  |  | (iv)unmodified copolymer |  |  |  |
| Properties | tensile strength (MPa) |  | 42 | 43 | 43 |
|  | tensile elongation (%) |  | >160 | >160 | >160 |
|  | tensile elastic modulus (GPa) |  | 1.7 | 1.8 | 1.7 |
|  | izod impact strength (J/m) at −40° C. |  | 450-NB | 420-NB | 450-NB |
|  | alcohol-containing gasoline barrier property (g · mm/m$^2$ · day) |  | 0.08 | 0.35 | 0.15 |
|  | morphology structure |  | A | A | A |
|  | average particle diameter (μm) of domain |  | 0.5 | 0.8 | 0.6 |

TABLE 4

|  |  |  | Comp. Ex 1 | Comp. Ex 2 | Comp. Ex 3 |
|---|---|---|---|---|---|
| Composition | polyamide resin (A) (parts by weight) | (1)MXD-6 | 100 |  | 100 |
|  |  | (2)MXD-6T |  |  |  |
|  |  | (3)MXD-7 |  |  |  |
|  |  | (4A)MXD-6CHDA-10A |  |  |  |
|  |  | (4B)MXD-6CHDA-10B |  |  |  |
|  |  | (5A)MXD-6CHDA-20A |  |  |  |
|  |  | (5B)MXD-6CHDA-20B |  |  |  |
|  |  | (6)nylon 66 |  | 100 |  |
|  | resin (B) (parts by weight) | (i)modified L-MDPE |  |  |  |
|  |  | (ii)modified copolymer |  |  | 150 |
|  |  | (iii)modified copolymer |  |  |  |
|  |  | (iv)unmodified copolymer |  |  |  |
| Properties | tensile strength (MPa) |  | 95 | 75 | 8 |
|  | tensile elongation (%) |  | 60 | 120 | >160 |
|  | tensile elastic modulus (GPa) |  | 3.6 | 2.2 | 0.3 |
|  | izod impact strength (J/m) at −40° C. |  | 30 | 45 | NB |
|  | alcohol-containing gasoline barrier property (g · mm/m$^2$ · day) |  | 0.06 | 450 | 680 |
|  | morphology structure |  | homogeneous | homogeneous | B |
|  | average particle diameter (μm) of domain |  | — | — | — |

TABLE 5

|  |  |  | Comp. Ex. 4 | Comp. Ex. 5 | Comp. Ex. 6 |
|---|---|---|---|---|---|
| Composition | polyamide resin (A) | (1)MXD-6 |  |  |  |
|  |  | (2)MXD-6T |  |  |  |

TABLE 5-continued

|  |  |  | Comp. Ex. 4 | Comp. Ex. 5 | Comp. Ex. 6 |
|---|---|---|---|---|---|
|  | (parts by weight) | (3)MXD-7 |  |  |  |
|  |  | (4A)MXD-6CHDA-10A |  | 100 |  |
|  |  | (4B)MXD-6CHDA-10B |  |  | 100 |
|  |  | (5A)MXD-6CHDA-20A |  |  |  |
|  |  | (5B)MXD-6CHDA-20B |  |  |  |
|  |  | (6)nylon 66 | 100 |  |  |
|  | resin (B) (parts by weight) | (i)modified L-MDPE |  |  |  |
|  |  | (ii) modified copolymer | 43 | 150 |  |
|  |  | (iii)modified copolymer |  |  |  |
|  |  | (iv)unmodified copolymer |  |  | 43 |
| Properties | tensile strength (MPa) |  | 39 | 9 | 35 |
|  | tensile elongation (%) |  | >160 | >160 | 15 |
|  | tensile elastic modulus (GPa) |  | 1.6 | 0.3 | 1.9 |
|  | izod impact strength (J/m) at −40° C. |  | 450-NB | NB | 60 |
|  | alcohol-containing gasoline barrier property (g · mm/m² · day) |  | 28 | 680 | 0.60 |
|  | morphology structure |  | A | B | A |
|  | average particle diameter (μm) of domain |  | 0.8 | — | 80 |

TABLE 6

|  |  |  | Comp. Ex 7 | Comp. Ex. 8 | Comp. Ex. 9 |
|---|---|---|---|---|---|
| Composition | polyamide resin (A) (parts by weight) | (1)MXD-6 | 100 | 100 |  |
|  |  | (2)MXD-6T |  |  |  |
|  |  | (3)MXD-7 |  |  | 100 |
|  |  | (4A)MXD-6CHDA-10A |  |  |  |
|  |  | (4B)MXD-6CHDA-10B |  |  |  |
|  |  | (5A)MXD-6CHDA-20A |  |  |  |
|  |  | (5B)MXD-6CHDA-20B |  |  |  |
|  |  | (6)nylon 66 |  |  |  |
|  | resin (B) (parts by weight) | (i)modified L-MDPE |  |  |  |
|  |  | (ii)modified copolymer | 54 | 27 | 54 |
|  |  | (iii)modified copolymer |  |  |  |
|  |  | (iv) unmodified copolymer |  |  |  |
| Properties | tensile strength (MPa) |  | 39 | 44 | 35 |
|  | tensile elongation (%) |  | >160 | >160 | >160 |
|  | tensile elastic modulus (GPa) |  | 1.6 | 2.0 | 1.5 |
|  | izod impact strength (J/m) at −40° C. |  | 580 | 230 | 610 |
|  | alcohol-containing gasoline barrier property (g · mm/m² · day) |  | 15.4 | 0.25 | 10.8 |
|  | morphology structure |  | A | A | A |
|  | average particle diameter (μm) of domain |  | 0.7 | 0.8 | 0.9 |

As is clear from the above-mentioned results, the molded products made from the material for a fuel system part of the present invention showed extremely superior properties of tensile strength, izod impact strength and the like. In addition, the barrier property of alcohol-containing gasoline at 65° C., too, was extremely fine. The materials of Examples 1-13 comprise a polyamide resin as a matrix component, and a polyolefin resin finely dispersed therein as a domain having an average particle diameter of 0.5-1.5 μm.

In Comparative Example 6, the average particle diameter of the domain became very large presumably because the polyolefin resin did not have a functional group capable of reacting with polyamide resin (A) and the both resins did not react with each other.

INDUSTRIAL APPLICABILITY

The material for a fuel system part of the present invention is superior in impact strength, rigidity and elongation, as well as in gasoline barrier property, because it shows low permeability of alcohol-containing gasoline at a high temperature of 65° C. Since the material consists of a single composition containing a resin blend, it does not need to be formed in a multilayer structure and can be molded by a conventional molding machine. Consequently, the processing cost is expected to be reduced and a broad range of shape designs can be applied. Such a material can be used as a material for a fuel system part such as a fuel tank and the like.

This application is based on application Nos. 2002-358515 and 2003-190330 filed in Japan, the contents of which are incorporated hereinto by reference.

The invention claimed is:

1. A material for a fuel system part, which comprises a resin composition comprising a polyamide resin (A) comprising, as an essential component, meta-xylylenediamine as a diamine component, wherein the polyamide resin (A) is selected from the group consisting of a polyamide resin comprising meta-xylylenediamine, cyclohexanedicarboxylic acid and adipic acid, a polyamide resin comprising meta-xylylenediamine, terephthalic acid and adipic acid, a copolymer thereof and a blend thereof, and a polyolefin resin (B) having a glass transition temperature lower than that of said polyamide resin (A) and a functional group capable of reacting with said polyamide resin (A), at a ratio of 25-75 parts by weight relative to 100 parts by weight of said polyamide resin (A), wherein said polyamide resin (A) is a matrix component and said resin (B) is a domain component.

2. The fuel system part material according to claim 1, wherein the domain made of the resin (B) has an average particle diameter of not more than 3 μm.

3. The material for a fuel system part according to claim 1, wherein the polyolefin resin has an acid anhydride group.

4. The material for a fuel system part according to claim 1, which has an izod impact strength with notch at −40° C. of not less than 200 J/m as measured according to ASTM D-638 and a permeability calculated from the weight change as measured by a cup method according to JIS-Z0208 of a solution of toluene (45 vol %), isooctane (45 vol %) and ethanol (10 vol %) after 250 hr at 65° C. of not more than 15 g·mm/m²·day.

5. A fuel system part comprising the material for a fuel system part according to claim 4.

6. The part according to claim 5, wherein the fuel system part is a fuel container comprising said material for fuel system part.

7. A fuel system part comprising the material for a fuel system part according to claim 1.

8. The part according to claim 7, wherein the fuel system part is a fuel container comprising said material for a fuel system part.

* * * * *